US009366532B2

(12) United States Patent
Meadows

(10) Patent No.: US 9,366,532 B2
(45) Date of Patent: Jun. 14, 2016

(54) ILLUMINATING SPIRIT LEVEL APPARATUS

(71) Applicant: Charlie Meadows, Athens, TX (US)

(72) Inventor: Charlie Meadows, Athens, TX (US)

(*) Notice: Subject to any disclaimer, the term of this patent is extended or adjusted under 35 U.S.C. 154(b) by 89 days.

(21) Appl. No.: 14/262,203

(22) Filed: Apr. 25, 2014

(65) Prior Publication Data
US 2015/0308822 A1 Oct. 29, 2015

(51) Int. Cl.
G01C 9/32 (2006.01)
G01C 9/34 (2006.01)

(52) U.S. Cl.
CPC ... G01C 9/32 (2013.01); G01C 9/34 (2013.01)

(58) Field of Classification Search
CPC .................................. G01C 9/32; G01C 9/34
USPC ................ 33/348.2, 366.11, 366.15, 366.21,
33/366.25, 381, 382
See application file for complete search history.

(56) References Cited

U.S. PATENT DOCUMENTS

| 3,584,212 A * | 6/1971 | Hansen .................... G01C 9/18 33/348.2 |
| 4,407,075 A | 10/1983 | MacDermott et al. |
| 4,493,155 A * | 1/1985 | Comeau ................... G01C 9/06 33/366.26 |
| 4,697,174 A * | 9/1987 | Viator, Sr. .............. G08B 21/10 33/366.26 |
| 4,912,854 A | 4/1990 | Weadon |
| 5,020,232 A | 6/1991 | Whiteford |
| 5,075,978 A | 12/1991 | Crowe |
| 5,209,343 A * | 5/1993 | Romano ................. H01H 35/02 200/61.45 R |
| 5,956,260 A * | 9/1999 | Heger ...................... G01C 9/06 33/391 |
| D453,479 S | 2/2002 | Greene |
| 6,481,366 B1 * | 11/2002 | Patera ..................... G09F 17/00 116/173 |
| 8,169,333 B2 * | 5/2012 | Verstege .............. A61D 17/002 200/61.52 |
| 8,359,757 B1 * | 1/2013 | Ruys ....................... G01C 9/32 33/348.2 |
| 8,522,446 B1 * | 9/2013 | Staudt ..................... G01C 9/32 33/348.2 |
| 2009/0235544 A1 * | 9/2009 | Spaulding ................ G01C 9/32 33/301 |
| 2011/0302796 A1 * | 12/2011 | Schubert .................. G01C 9/06 33/366.11 |
| 2014/0187681 A1 * | 7/2014 | Smith ...................... G01C 9/10 524/21 |

* cited by examiner

Primary Examiner — G. Bradley Bennett
(74) Attorney, Agent, or Firm — The Keys Law Firm PLLC

(57) ABSTRACT

An illuminating spirit level apparatus comprises a spirit level base having a first vial assembly, a second vial assembly, a light, and a battery. The vial assemblies are each filled with a fluid, having a metal ball slidably disposed therein and having a pair of electrodes disposed at the central lengthwise point of on each side of the vial. The battery provides an electrical power source for the light, and the battery, the light, the electrodes of the first vial assembly, and the electrodes of the second vial assembly are electrically connected in series through circuitry wiring. When the spirit level base is placed in a level and/or plumb orientation, the metal ball in the relevant vial assembly moves to the center of that vial assembly contacting and electrically connecting the electrodes on either side of the vial assembly, resulting in the light illuminating with electricity from the battery.

11 Claims, 2 Drawing Sheets

ILLUMINATING SPIRIT LEVEL APPARATUS

BACKGROUND OF THE INVENTION

1. Field of the Invention

This invention relates generally to hardware accessories and, more particularly, to a spirit level apparatus adapted to complete a circuit and illuminate to indicate a level surface.

2. Description of the Prior Art

The use and utility of conventional level devices, typically containing various vials containing a small bubble or ball in a liquid, is well known. A problem which still exists, however, is that using the naked eye to gauge the placement of the bubble or ball in such conventional levels can leave for some margin of error; such devices are exceptional at determining if a surface is substantially level, but do not generally provide the precision needed to determine if a surface is exactly level. Thus, there remains a need for an illuminating spirit level apparatus which would cause an integrated light to illuminate when the integrated vial's alignment indicates a surface is level and/or plumb. It would be helpful if such an illuminating spirit level apparatus enabled a user to utilize a spirit level in low or otherwise poor lighting conditions. It would be additionally desirable for such an illuminating spirit level apparatus to employ a substantially conventional vial set up and be used as conventional levels are used.

The Applicant's invention described herein provides for a spirit level apparatus adapted to cause an integrated light illuminate when the spirit level is placed on a level surface or otherwise in a level orientation. The primary components in Applicant's illuminating spirit level apparatus are a spirit level body, a plurality of vials and electrodes, and an integrated light. having handle. When in operation, illuminating spirit level apparatus provides a visual indication of a level orientation through illumination. As a result, many of the limitations imposed by prior art structures are removed.

SUMMARY OF THE INVENTION

An illuminating spirit level apparatus for providing the illumination of a light to indicate when a surface measured is level and/or plumb. The illuminating spirit level apparatus comprises a spirit level base having a first vial assembly, a second vial assembly, a light, and a battery. The first vial assembly and the second vial assembly (collectively, the vial assemblies) are identically structured vial assemblies, each filled with a fluid, having a metal ball slidably disposed therein and having a pair of electrodes disposed at the central lengthwise point of on each side of the vial. The battery provides an electrical power source for the light, and the battery, the light, the electrodes of the first vial assembly, and the electrodes of the second vial assembly are electrically connected in series through circuitry wiring.

In operation, when the illuminating spirit level apparatus is placed in a level and/or plumb orientation, the metal ball in the relevant vial assembly moves to the center of that vial assembly contacting and electrically connecting the electrodes on either side of the vial assembly. This results in the closing of the electrical circuit containing the battery, the light, and the first vial assembly and/or second vial assembly and the light illuminating with electricity from the battery. When the illuminating spirit level apparatus is moved from or otherwise placed in an orientation wherein it is not level and/or plumb, the electrical circuit is broken. In this regard, the first vial assembly provides a first leveling means and the second vial assembly provides a second leveling means.

It is an object of this invention to provide an illuminating spirit level apparatus which would cause an integrated light to illuminate when the integrated vial's alignment indicates a surface is level and/or plumb.

It is another object of this invention to provide an illuminating spirit level apparatus which enabled a user to utilize a spirit level in low or otherwise poor lighting conditions.

It is yet another object of this invention to provide an illuminating spirit level apparatus to employ a substantially conventional vial set up and be used as conventional levels are used.

These and other objects will be apparent to one of skill in the art.

DETAILED DESCRIPTION OF THE INVENTION

Figure 1:
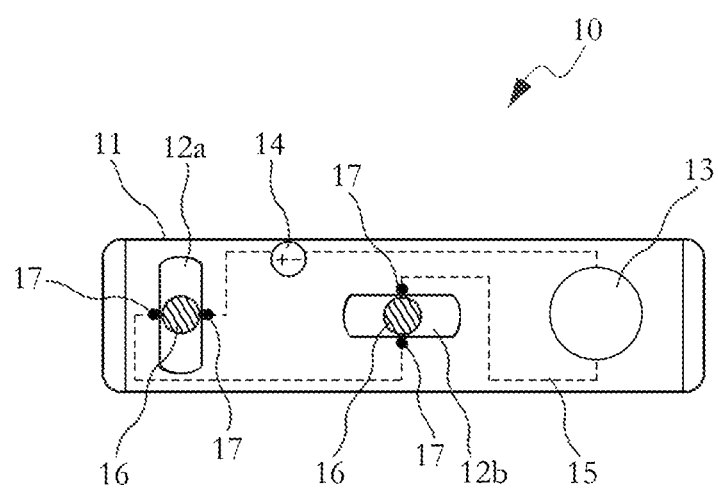
FIG. 1 is a top plan view of an illuminating spirit level apparatus built in accordance with the present invention having circuitry wiring in shadow.

Referring now to the drawings and in particular FIG. 1, an illuminating spirit level apparatus 10 is shown as a tubular spirit level base 11 having a first vial assembly 12a, a second vial assembly 12b, a light 13, and a battery 14. The spirit level base 11 is constructed as conventional rigid, elongated, vial based spirit levels. The light is a conventional LED light in the preferred embodiment. The battery 14 provides a power source for the light 13, and the battery 14, the light 13, the first vial assembly 12a, and the second vial assembly 12b are electrically connected in series through circuitry wiring 15.

The first vial assembly 12a and the second vial assembly 12b (collectively, the vial assemblies 12) are identically structured vial assemblies, each filled with a fluid and having a metal ball 16 slidably disposed therein. In the preferred embodiment, the fluid is an liquid alcohol substance, such as a spirit, and the metal ball is steel. At the center point on each side of each respective vial assembly 12 is an electrode 17 connected to circuitry wiring 15. Each electrode 16 provides connection point which enables electrical current to pass from the electrode 16 on one side of a particular vial assembly 12 to the electrode 17 on the other side of the same vial assembly 12 when the metal ball 16 is in the exact center point of that vial assembly 12. In this regard, the vial assemblies 12 are configured to make a circuit when the metal ball 16 is placed or held in the center location of the vial assembly 12 in which it is disposed and to break a circuit when the metal ball 16 is moved from or otherwise absent from the center location of the vial assembly in which it is disposed.

In operation, when the illuminating spirit level apparatus 10 is placed in a level and plumb orientation, the metal balls 16 in each respective vial assembly 12 moves to the center of the vial assembly 12, resulting in the closing of the electrical circuit containing the battery 14, the light 13, the first vial assembly 12a, and the second vial assembly 12b are electrically connected in series through circuitry wiring 15. When this electrical circuit is closed, the light 13 receives electricity from the battery 14 and illuminates. When the illuminating spirit level apparatus 10 is moved from or otherwise placed in an orientation wherein it is not level or plumb, the electrical circuit is broken, turning the light 13 off by disconnecting it from its source of electricity. By this mechanism, the light 14 of the illuminating spirit level apparatus 10 only illuminates while the spirit level base 11 is in a level and plumb orientation that causes the metal balls 16 in the respective vial assemblies 12 to be in contact the electrodes 17 at the exact center of the respective vial assemblies 12.

Figure 2:
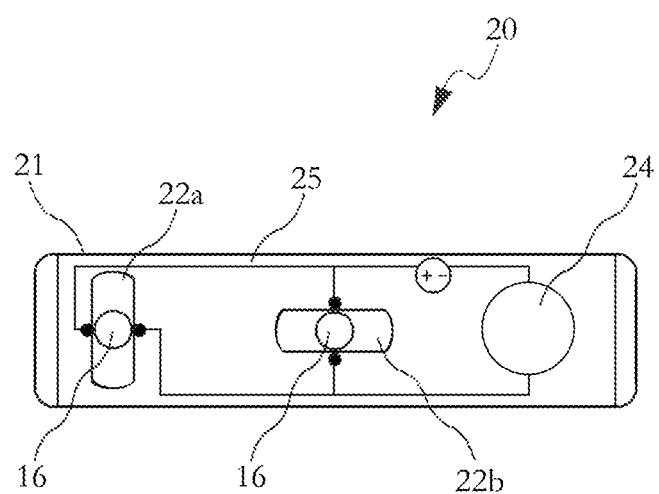
FIG. 2 is a top plan view of an illuminating spirit level apparatus built in accordance with an alternate embodiment of the present invention.

Referring now to FIG. 2, in an alternate embodiment, the components of the illuminating spirit level apparatus 20 operate in a substantially identical manner, except that the electrical wiring 25 is structured so that an electrical circuit is closed when the metal ball 16 of either the first vial assembly 22a or the second vial assembly 22b moves to the center of the vial assembly it is contained in. By this mechanism, the light 24 of the illuminating spirit level apparatus 20 illuminates while the spirit level base 21 is in a level or plumb orientation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An illuminating spirit level apparatus, comprising:
    a spirit level base;
    a first vial assembly disposed on said spirit level base and having an alpha lengthwise side and a beta lengthwise side and a center, wherein said alpha lengthwise side and beta lengthwise side define opposite sides of the first vial assembly;
    an alpha electrode integral with the alpha lengthwise side at a location adjacent to the center of the first vial assembly and a beta electrode integral with the beta lengthwise side at a location adjacent to the center of the first vial assembly, wherein said first vial assembly is filled with a fluid and includes a first conductive member slidably disposed therein; and
    a light and a power source disposed on said spirit level base, wherein said light, alpha electrode, first conductive member, beta electrode, and said power source define a first electric circuit which allows electricity to be delivered to said light from said power source when the first conductive member is positioned in the center of the first vial assembly.

2. The illuminating spirit level apparatus of claim 1, additionally comprising:
    a second vial assembly disposed on said spirit level base and having a gamma lengthwise side, a delta lengthwise side and a center, wherein said gamma lengthwise side and delta lengthwise side define opposite sides of the second vial assembly;
    a gamma electrode integral with the alpha lengthwise side at a location adjacent to the center of the second vial assembly and a delta electrode integral with the delta lengthwise side at a location adjacent to the center of the second vial assembly, wherein said second vial assembly is filled with a fluid and includes a second conductive member slidably disposed therein; and
    said light, gamma electrode, second conductive member, delta electrode, and said power source defining a second electric circuit which allows electricity to be delivered to said light from said power source when the second conductive member is positioned in the center of the second vial assembly.

3. The illuminating spirit level apparatus of claim 2, wherein said second conductive member defines a metal ball.

4. The illuminating spirit level apparatus of claim 1, wherein said first conductive member defines a metal ball.

5. The illuminating spirit level apparatus of claim 1, wherein the power source is a battery.

6. The illuminating spirit level apparatus of claim 1, wherein the light is an LED light.

7. An illuminating spirit level apparatus, comprising:
    a spirit level base;
    a first vial assembly disposed on said spirit level base and having an alpha lengthwise side and a beta lengthwise side and a center, wherein said alpha lengthwise side and beta lengthwise side define opposite sides of the first vial assembly;
    an alpha electrode integral with the alpha lengthwise side at a location adjacent to the center of the first vial assembly and a beta electrode integral with the beta lengthwise side at a location adjacent to the center of the first vial assembly, wherein said first vial assembly is filled with a fluid and includes a first conductive member slidably disposed therein;
    a second vial assembly disposed on said spirit level base and having a gamma lengthwise side, delta lengthwise side and a center, wherein said gamma lengthwise side and delta lengthwise side define opposite sides of the second vial assembly;
    a gamma electrode integral with the alpha lengthwise side at a location adjacent to the center of the second vial assembly and a delta electrode integral with the delta lengthwise side at a location adjacent to the center of the second vial assembly, wherein said second vial assembly is filled with a fluid and includes a second conductive member slidably disposed therein;
    a light and a power source disposed on said spirit level base, wherein said light, alpha electrode, first conductive member, beta electrode, and said power source define a first electric circuit and said light, gamma electrode, second conductive member, delta electrode, and said power source defining a second electric circuit; and
    said first electric circuit and said second electric circuit configured to allow electricity to be delivered to said light from said power source when at least one of the first conductive member is positioned in the center of the first vial assembly and the second conductive member is positioned in the center of the second vial assembly.

8. The illuminating spirit level apparatus of claim 7, wherein said first electric circuit and said second electric circuit are configured to allow electricity to be delivered to said light from said power source only when both the first conductive member is positioned in the center of the first vial assembly and the second conductive member is positioned in the center of the second vial assembly.

9. The illuminating spirit level apparatus of claim 7, wherein:
    said second conductive member defines a metal ball; and
    said first conductive member defines a metal ball.

10. The illuminating spirit level apparatus of claim 7, wherein the power source is a battery.

11. The illuminating spirit level apparatus of claim 7, wherein the light is an LED light.

* * * * *